United States Patent [19]

Rannenberg

[11] 4,265,397
[45] May 5, 1981

[54] COMBINED FRESH AIR REGENERATOR AND AIR CYCLE HEAT PUMP

[75] Inventor: George C. Rannenberg, Canton, Conn.

[73] Assignee: United Technologies Corporation, Hartford, Conn.

[21] Appl. No.: 52,886

[22] Filed: Jun. 28, 1979

[51] Int. Cl.³ .............................................. G05D 23/00
[52] U.S. Cl. ..................... 237/2 B; 62/402; 417/366; 417/368
[58] Field of Search ......... 237/2 B; 165/15, DIG. 12; 62/401, 402, 324 B; 126/247; 417/368, 366

[56] References Cited

U.S. PATENT DOCUMENTS

| 2,602,307 | 7/1952 | Collison | 62/401 X |
| 3,191,403 | 6/1965 | Ladusaw | 62/505 |

Primary Examiner—Albert W. Davis
Attorney, Agent, or Firm—Donald F. Bradley; John Swiatocha

[57] ABSTRACT

An air cycle heat pump uses a regenerative heat exchanger to provide warm air to heat a load, while at the same time providing fresh air to the load. The stale air returned from the load is utilized as the refrigerant air in an electrically driven regenerative air cycle heat pump, and no additional heat exchangers are required, thereby significantly reducing the electric power needed for heating the load. A turbine-driven compressor is used to raise the stale load air in pressure and temperature and, after giving up some of its heat to the fresh ambient air used to heat the load, the compressed refrigerant air performs useful work in the expansion turbine before being returned to ambient.

2 Claims, 3 Drawing Figures

COMBINED FRESH AIR REGENERATOR AND AIR CYCLE HEAT PUMP

BACKGROUND OF THE INVENTION

1. Field of the Invention

This invention relates to the heating of loads utilizing both a regenerative heat exchanger for energy transfer between stale air leaving the load and fresh air entering the load, and an electrically powered air cycle heat pump for efficiently providing heat to the load with the same fresh air. The heat pump includes a turbine driven compressor which utilizes the stale air as the refrigerant, the compressed stale air providing the heat for the regenerative heat exchanger and the turbine performing work in discharging the stale refrigerant air to ambient.

2. Description of the Prior Art

It is well known to use a regenerative heat exchanger to conserve energy in a system in which fresh air is supplied to a load to replace stale air. Likewise it is known to use an electric-powered air cycle heat pump including a compressor-expander to reduce heating energy requirements. Many different configurations exist for the construction of the regenerative heat exchanger including plates, fins, tubes and other components thereof, most of which may be used in conjunction with the present invention. Likewise, any well known construction of electric-driven compressor-expander for air cycle heat pumps may be used with the present invention.

This invention relates specifically to the use of regenerative heat exchangers in conjunction with electric-driven comressor-expanders in a novel arrangement to produce a highly efficient regenerative air cycle heat pump system, while at the same time being able to provide fresh air to the load.

It is therefore an object of this invention to efficiently provide fresh air to a load in a regenerative air cycle heat pump system.

Another object of this invention is the use of a single heat exchanger in combination with an electrically-driven air cycle heat pump including a compressor-expander to heat a load with fresh air.

SUMMARY OF THE INVENTION

In accordance with a preferred embodiment of the present invention, there is provided a heat pump including an electrically-driven compressor-expander in combination with a single heat exchanger of the regenerative type, the heat pump and heat exchanger being arranged in a novel manner whereby stale air ducted from the load is used as the refrigerant air and, after compression thereof, is used to transfer heat energy to fresh air ducted to the load via the heat exchanger. The stale refrigerant air, after passing through the regenerative heat exchanger, is expanded to provide energy to the compressor and is then vented to ambient. The novel construction avoids the deficiencies of prior heat pump systems which use regenerative heat exchangers but do not provide fresh air to the load, and which require an additional heat exchanger for heat transfer. Likewise the novel construction is more efficient than the prior art regenerative fresh air systems which do not use a heat pump and simply vent the stale load air to ambient through the heat exchanger in heat exchange relationship with fresh ambient air.

DESCRIPTION OF THE PREFERRED EMBODIMENT

Figure 1:
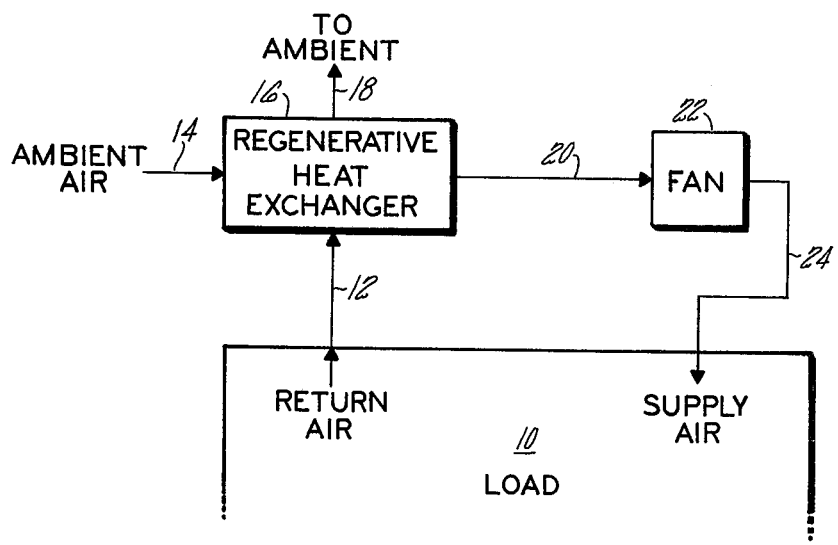
FIG. 1 is a schematic diagram of a prior art fresh air system without a heat pump.
Figure 2:
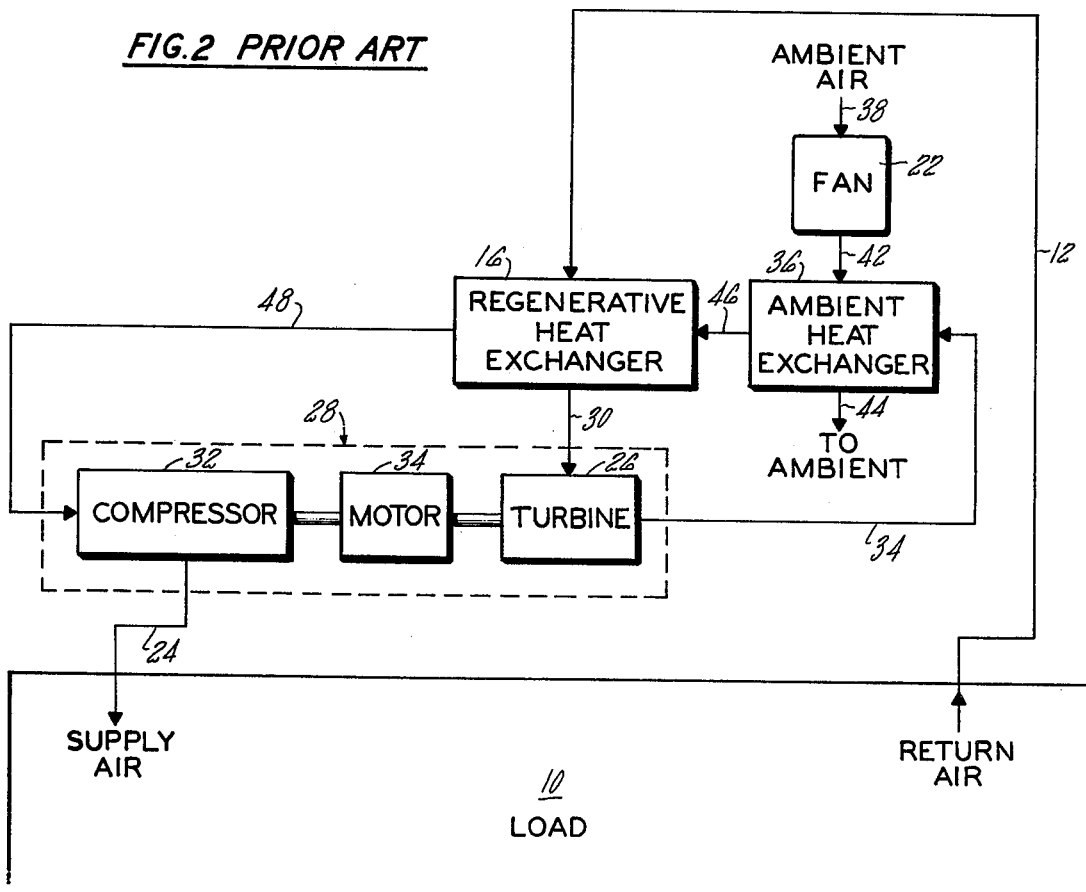
FIG. 2 is a schematic diagram of a typical prior art regenerative heat pump system which uses an additional heat exchanger and does not provide fresh air to the load.
Figure 3:
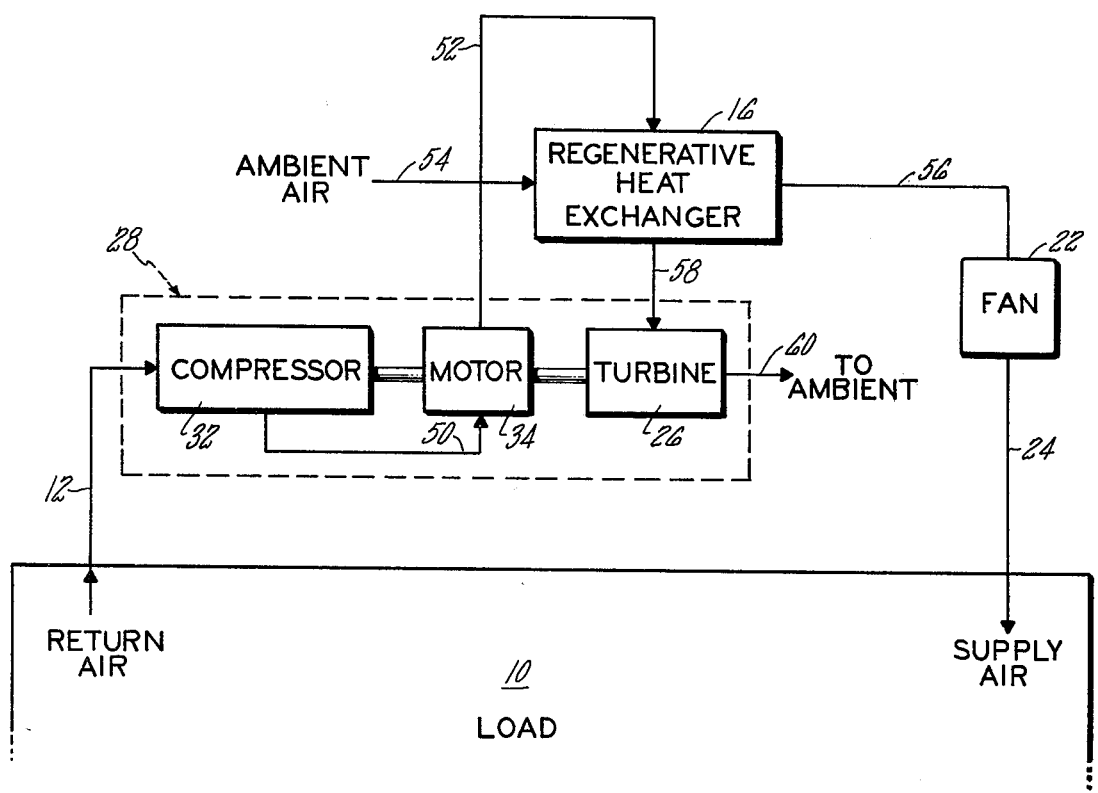
FIG. 3 is a schematic diagram of the fresh air regenerative air cycle heat pump system of the present invention.

With respect fo FIGS. 1-3, common elements are identified by the same reference numerals.

FIG. 1 shows a typical prior art fresh air system in which stale return air from a load 10, typically a building, is removed via a duct 12 and replaced by fresh supply air from an ambient air source 14, the ambient air being in heat exchange relation with the stale load air in a regenerative heat exchanger 16. The stale load air is returned to ambient via duct 18, while the fresh ambient air is fed to load 10 via duct 20, fan 22 and duch 24. The heat exchange occurring in the regenerative heat exchanger 16 will heat the ambient fresh air depending on the relative temperatures of the two air sources, and essentially will attempt to maintain the fresh ambient air close to the stale return load air temperature. This type of system, while slightly more efficient than the use of a fan alone to exchange air in a load, is essentially only a fresh air system and is quite unsatisfactory in cool weather.

FIG. 2 shows a typical prior art regenerative heat pump system without the fresh air function. This Figure is essentially that shown in ASME Paper No. 78-GT-60, dated Apr. 9, 1978, the paper being entitled "The Reversed Brayton Cycle Heat Pump—A Natural Open Cycle for HVAC Applications" by F. Sisto. The utility of the heat pump is to provide heat to the load; the disadvantages of the system of FIG. 2 and other typical prior art heat pump systems are that the stale load air is recirculated, icing sometimes occurs, and two heat exchangers are required.

Referring to FIG. 2, the stale return air from load 10 is fed via duct 12 to regenerative heat exchanger 16 where, as will be described, it transfers some of its heat to the cold refrigerant air produced by the turbine 26 of compressor-expander assembly 28, shown enclosed in dashed lines. After the cooling of the stale return air in regenerative heat exchanger 16, the air passes via duct 30 into the turbine 26 where, via expansion therein, it is cooled to a very low temperature, typically substantially below freezing. The turbine 26 is mechanically connected to and supplies a portion of the power required by a compressor 32, the remainder of the compressor power being supplied by an electric drive motor 34.

After expansion in the turbine, the cool air passes via duct 34 into an ambient heat exchanger 36. Also fed to the ambient heat exchanger 36 is ambient air from duct 38 via fan 22 and duct 42. Since the heat pump is useful primarily when the ambient air is quite cool, and since the air rejected from turbine 26 in duct 34 is well below freezing, heat is absorbed by the turbine discharge air from the ambient air in ambient heat exchanger 36, and the cooled ambient air is rejected again to ambient via duct 44. The turbine discharge air is then passed via duct 46 to regenerate heat exchanger 16 where, as explained previously, it absorbs additional heat from the stale load air. The turbine discharge air then proceeds from regenerative heat exchanger 16 via duct 48 to compressor 32 where it is increased considerably in pressure and temperature, and fed directly to the load via duct 24.

The present invention, described in FIG. 3, provides heat from a heat pump as in FIG. 2, as well as fresh air as in FIG. 1, using only a single regenerative heat exchanger 16. Stale air leaves the load 10 via duct 12 and is delivered directly to the inlet of compressor 32 of compressor-expander 28. The air is compressed and increased in temperature, and then fed via duct 50 to motor 34 where the air both cools the motor and recovers the heat of motor inefficiencies. As in FIG. 2, compressor 32 receives a portion of its torque from turbine 26 and the remainder of its torque from electric motor 34.

The compressed hot air then proceeds from motor 34 via duct 52 into the hot inlet side of regenerative heat exchanger 16. Fresh ambient air is also fed to the regenerative heat exchanger 16 via duct 54, the ambient air absorbing heat in the heat exchanger from the hot air from duct 52. The ambient air, now raised in temperature, proceeds via duct 56, fan 22 and air supply duct 24. Fan 22 may not be required due to the positive airflow assured by compressor-expander assembly 28.

The compressed hot air, after transferring its heat to the fresh ambient air, is fed via duct 58 to turbine 26 where it is cooled by performing work therein and is then rejected to ambient via duct 60 at a temperature significantly less than ambient.

While the invention has been described with respect to its preferred embodiment and the best mode presently contemplated, modifications to the components and operation thereof may be made by those skilled in the art without departing from the scope of the invention as hereinafter claimed.

I claim:

1. A regenerative air cycle heat pump system for supplying heated fresh air to a load, said heat pump system comprising:
   a compressor;
   a turbo-expander mechanically connected to said compressor to provide power thereto;
   an electric motor mechanically connected to said compressor for providing additional power thereto;
   means for supplying stale air from said load to said compressor where said load air is increased in temperature and pressure;
   a source of ambient air;
   a regenerative heat exchanger connecting, through heat transfer surfaces within said heat exchanger, the source of ambient air without prior expansion thereof, with the load air compressed by said compressor, said load air rejecting some of its heat to said ambient air in said heat exchanger;
   means for passing said compressed load air through said electric motor prior to supplying said load air to said regenerative heat exchanger, said load air simultaneously cooling said motor and recovering the heat of motor inefficiencies;
   means for supplying said heated ambient air from said regenerative heat exchanger to said load;
   means for supplying said compressed load air from said regenerative heat exchanger to said turbo-expander where said load air is expanded and cooled substantially below ambient temperature; and
   means for rejecting said expanded load air from said turbo-expander to ambient.

2. A system as in claim 1 and including fan means connected in said ambient air path between said regenerative heat exchanger and said load.

* * * * *